Patented Mar. 14, 1933

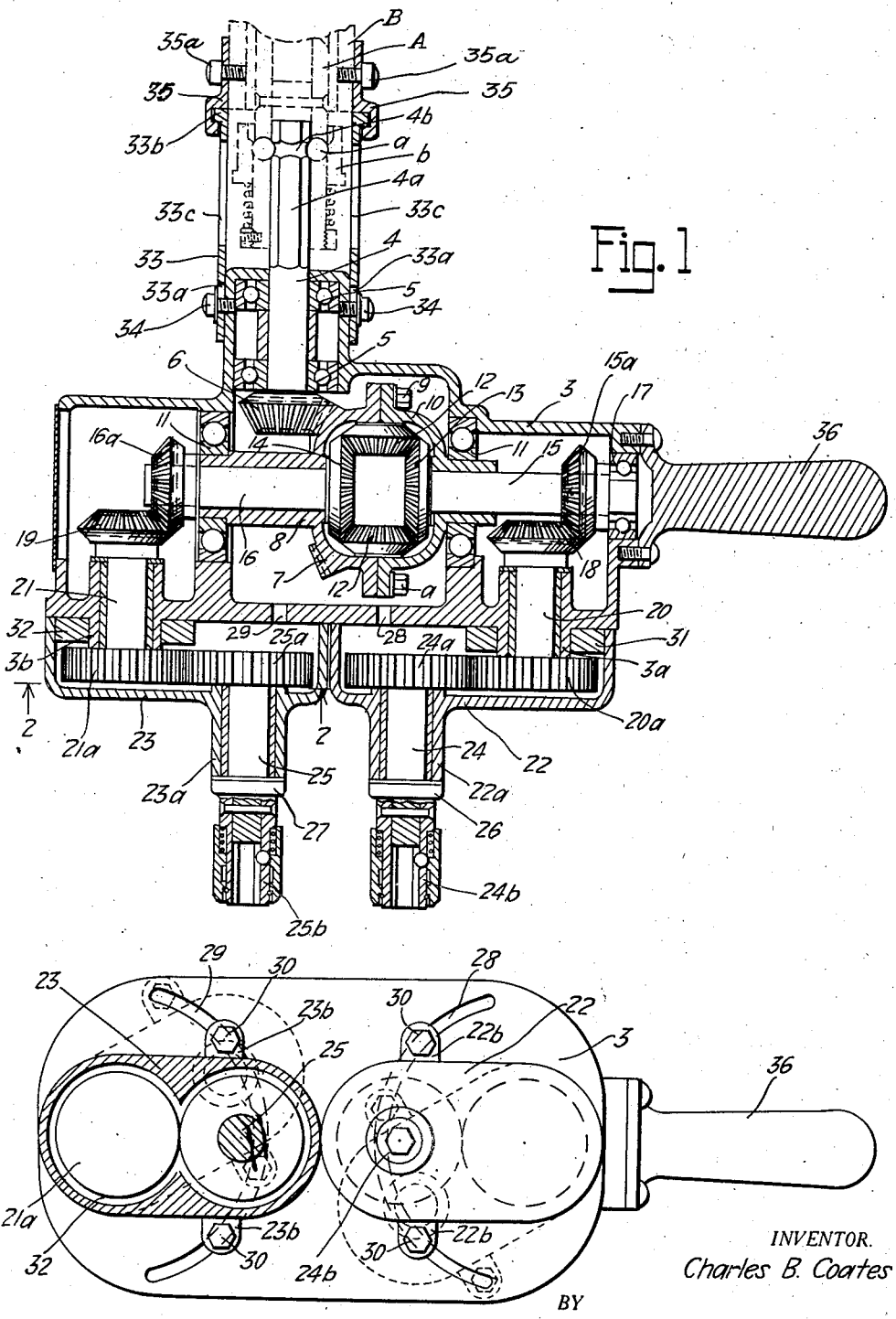

1,901,436

UNITED STATES PATENT OFFICE

CHARLES B. COATES, OF CLEVELAND, OHIO, ASSIGNOR TO CHICAGO PNEUMATIC TOOL COMPANY, OF NEW YORK, N. Y., A CORPORATION OF NEW JERSEY

DUPLEX EQUALIZING APPARATUS

Application filed March 23, 1928. Serial No. 264,193.

This invention relates to the application or driving of securing members such as nuts, bolts, studs, screws, and the like and to improved apparatus for performing such operations.

In bolting on or otherwise securing journal caps, counterbalance pieces, spring hangers, etc. in erecting machines, engines, automobiles and in assembly work generally, it is desirable not to draw each nut or bolt down tightly until the slack has been taken up on all of them. Any other course frequently means tilting or distorting the strap or other holding piece. In ordinary practice at least two operations and the exercise of considerable care on the part of the operator are required.

One object of the invention is to effect economies in assembly work by saving time and labor. Another object is to set up two securing members at the same time to exactly the same tightness. Another object is to eliminate the necessity for great care or skill on the part of the operator. Other objects will be apparent from the detailed description which follows.

The invention involves apparatus which will operate upon two securing members at the same time, equalizing the application of power thereto so that they are set up together to the same degree of tightness. By preference the apparatus takes the form of an attachment readily applicable to known types of power machines and tools. Apparatus for setting up more than two securing members in a similar manner at one time is described and claimed in my copending application Serial No. 264,194, filed of even date herewith.

In order to illustrate the invention, one concrete embodiment thereof is shown in the accompanying drawing in which:

Fig. 1 is a vertical sectional view through the attachment and disclosing one way of connecting the same to a driving motor.

Fig. 2 is a bottom plan view partly in section substantially on the line 2—2 of Fig. 1.

The embodiment of the invention chosen for the purpose of illustration comprises an attachment in the form of a compact device adapted to be conveniently attached to a portable or fixed power machine and comprises a casing 3 from which projects a spindle 4 for connection to the driving means. Spindle 4 is supported for rotation in casing 3 by spaced bearings 5 and has on its inner end a bevelled gear 6 which meshes with a ring gear 7 on a half housing 8. Attached to half housing 8 in any suitable manner as by cap screws 9 is a complementary half housing 10 containing therebetween a differential system of gearing. Housings 8 and 10 are mounted for rotation as a unit in spaced bearings 11 within casing 3. Within differential housing 8, 10 are mounted the idler gears 12 of the differential of which there may be two or more as desired. Meshing with idler gears 12 are gears 13 and 14 whose shafts 15 and 16 respectively, are journaled in the housings 10 and 8. Shaft 15 has at its outer end an additional bearing 17 in casing 3. Adjacent their outer ends, shafts 15 and 16 have mitre gears 15a and 16a which mesh with mitre gears 18 and 19 on shafts 20 and 21 suitably journaled in casing 3 and extending therebeyond, the outer ends carrying spur gears 20a and 21a. Adjustably secured to the lower face of casing 3 are gear housings 22, 23 having bearing extensions 22a, 23a in which are rotatably supported spindles 24 and 25 the upper ends of which have secured thereto spur gears 24a and 25a in mesh respectively with gears 20a and 21a. Thrust bearings 26 and 27 are provided on spindles 24 and 25 immediately adjacent the bearing extensions 22a and 23a. The spindles 24 and 25 carry at their free ends, chuck members 24b and 25b of any suitable or desired type for engaging the securing members to be driven directly or for receiving suitable sockets or other devices which fit the securing members.

While gear housings 22 and 23 may be mounted in fixed position upon the lower face of casing 3, it is preferable to arrange such housings adjustably in order to adapt the attachment simultaneously to drive bolts or other securing members which may vary as to the spacing therebetween. To this end the housings 22 and 23 are arranged for limited rotative adjustment about the axes of shafts 20 and 21 respectively. One arrangement is to provide arcuate slots 28 and 29 in the base of casing 3 to receive guide and clamping bolts 30 extending through perforated ears or lugs 22b and 23b on housings 22 and 23 respectively. As additional guiding means, casing 3 is preferably formed with integral bearing bosses or flanges 3a and 3b for shafts 20 and 21, which bosses extend within housings 22 and 23 respectively and having thereon annular guide collars 31 and 32. Housings 22 and 23 are so formed, as indicated on the left or sectioned side of Fig. 2, as to have a maximum bearing area in contact with guide collars 31 and 32.

The attachment may be secured to a driving machine in any suitable or desired manner, Fig. 1 illustrating one form of connection. As shown, spindle 4 of the attachment has a polygonal end 4a with an annular groove 4b therein for insertion within the chuck end of rotatable spindle A of the driving means, the spindle A being provided with the usual locking ball $d$ and locking sleeve $b$. Spindle A may project from any power machine such as an electric or pneumatic drill, drill press, and the like. To assist in holding the attachment to the housing B of the driving motor or machine a tube 33 is secured to casing 3 as by screws 34 which project through slots 33a in the tube whereby the tube has limited movement relative to casing 3. The outer or free end of tube 33 has a radial projection or flange 33b which is engaged in two half clamps 35 secured to the motor housing B as by screws 35a. This connection enables the attachment to be turned through a large angle so that the socket members on spindles 24 and 25 may be conveniently applied to the nuts or other securing members which are to be driven. The extent of this angular movement may be limited, if desired, by a suitable stop pin (not shown). Tube 33 is provided with openings or slots 33c to give access to the control collar $b$ for the locking ball $a$. The object of the limited movement of tube 33 relative to casing 3 provided by the slots 33a is to permit the operation of any releasable clutch means on the driving motor when the nuts or other securing members are driven home. One or more handles 36 may be secured to the attachment to assist in directing the same to the work.

In operation, the rotation of the driving motor is transmitted through spindle 4 of the attachment and through the intervening gearing to the nut sockets or other devices on spindles 24 and 25. After using the handle 36 to adjust the attachment to the work, as by disposing the sockets of spindles 24 and 25 over the nuts to be driven, it will not be necessary to hold handle 36 as the sockets on the two nuts will prevent rotation of the attachment as a unit. If one nut should be started on its stud farther than the other and reach the working face first, the slight friction then developed will stop that side of the differential and the other nut will be driven down at double speed until the friction is the same on both sides. Thereupon the torque will be equally distributed and both nuts will be driven home with equal tightness. In Fig. 2 the housings are shown in full lines in their positions of minimum spacing and in broken outline in their positions of maximum spacing. This provision for adjustment of gear housings 22 and 23 on casings 3 permits bringing the spindles 24 and 25 to the proper spacing for the work to be done and then securely clamping them in adjusted position.

While the invention has been herein disclosed in what is now considered to be a preferred form, it is to be understood that the invention is not limited to the specific details thereof but covers all changes, modifications and adaptations within the scope of the appended claims.

I claim as my invention:

1. The combination with a machine having a rotatable spindle extending therefrom, of an attachment therefor for driving threaded securing members simultaneously to the same degree of tightness, said attachment having a plurality of spindles projecting therefrom, means for transmitting the rotation of said rotatable spindle differentially to said plurality of spindles, means for supporting said attachment upon said machine, and means for adjusting said attachment rotatably relative to said machine.

2. The combination with a machine having a rotatable spindle extending therefrom, of an attachment therefor for driving threaded securing members simultaneously to the same degree of tightness, said attachment having a plurality of spindles projecting therefrom in substantial parallelism with said rotatable spindle, means for transmitting the rotation of said rotatable spindle differentially to said pluralty of spindles, means for adjusting the position of one of said plurality of spindles relative to said rotatable spindle, and means on said plurality of spindles for engaging securing members disposed in the same plane.

3. An attachment for use with a rotation motor for driving securing members simultaneously to the same degree of tightness comprising a casing having a single driving member projecting from one side for connection to the motor and a plurality of driven members projecting from another side, transmission mechanism within said casing establishing a differential driving connection between said driving member and said driven members, and means on said driven members for engaging securing members disposed in the same plane.

4. An attachment for use with a rotatable member for setting up securing members simultaneously to the same degree of tightness comprising a casing having a single driving member for connection with said rotatable member, a differential gear member within said casing to be driven by said driving member, spaced shafts disposed transversely with relation to said driving member and driven by said differential member, spindles disposed in parallelism with said driving member and driven by said shafts, and means for adjusting the distance between said spindles without disturbing the driving connection to said shafts.

5. An attachment for use with a rotative motor for setting up threaded securing members simultaneously to the same degree of tightness comprising a casing having a single driving member at one side for connection with the motor and two spindles at another side, and transmission means within said casing establishing a differential driving connection between said driving member and said spindles.

6. An attachment for use with a rotative motor for setting up threaded securing members simultaneously to the same degree of tightness comprising a casing having a single driving member at one side for connection with the motor and two spindles at the opposite side, and differential transmission means between said driving member and said spindles extending transversely of the same.

7. An attachment for use with a rotative motor for setting up threaded securing members simultaneously to the same degree of tightness comprising a casing having a single driving member at one side for connection with the motor and two spindles projecting from the opposite side, transmission means between said driving member and said spindles including a differential gear and spaced shafts driven by the latter disposed transversely of said driving member and of said spindles, and means on said spindles for engaging securing members disposed in the same plane.

8. The combination with a machine having a housing with a hollow rotatable spindle projecting therefrom and with a manually releasable chuck on said spindle, of an attachment having a driven member in telescoping engagement with said spindle and retained therein by said chuck, a sleeve member on said attachment enclosing said driven member and chuck and having a radially projecting flange, sectional clamping members on said machine housing engaging said flange to support said attachment for convenient rotative adjustment, said sleeve member having opposed slots to give access to said chuck to release the same when the attachment is to be removed.

Signed by me at Cleveland, in the county of Cuyahoga and State of Ohio this 19th day of March, 1928.

CHARLES B. COATES.